Oct. 16, 1951  F. N. WOODHOUSE ET AL  2,571,807
FILM WINDING AND REWINDING MECHANISM
Filed March 1, 1949  3 Sheets-Sheet 1
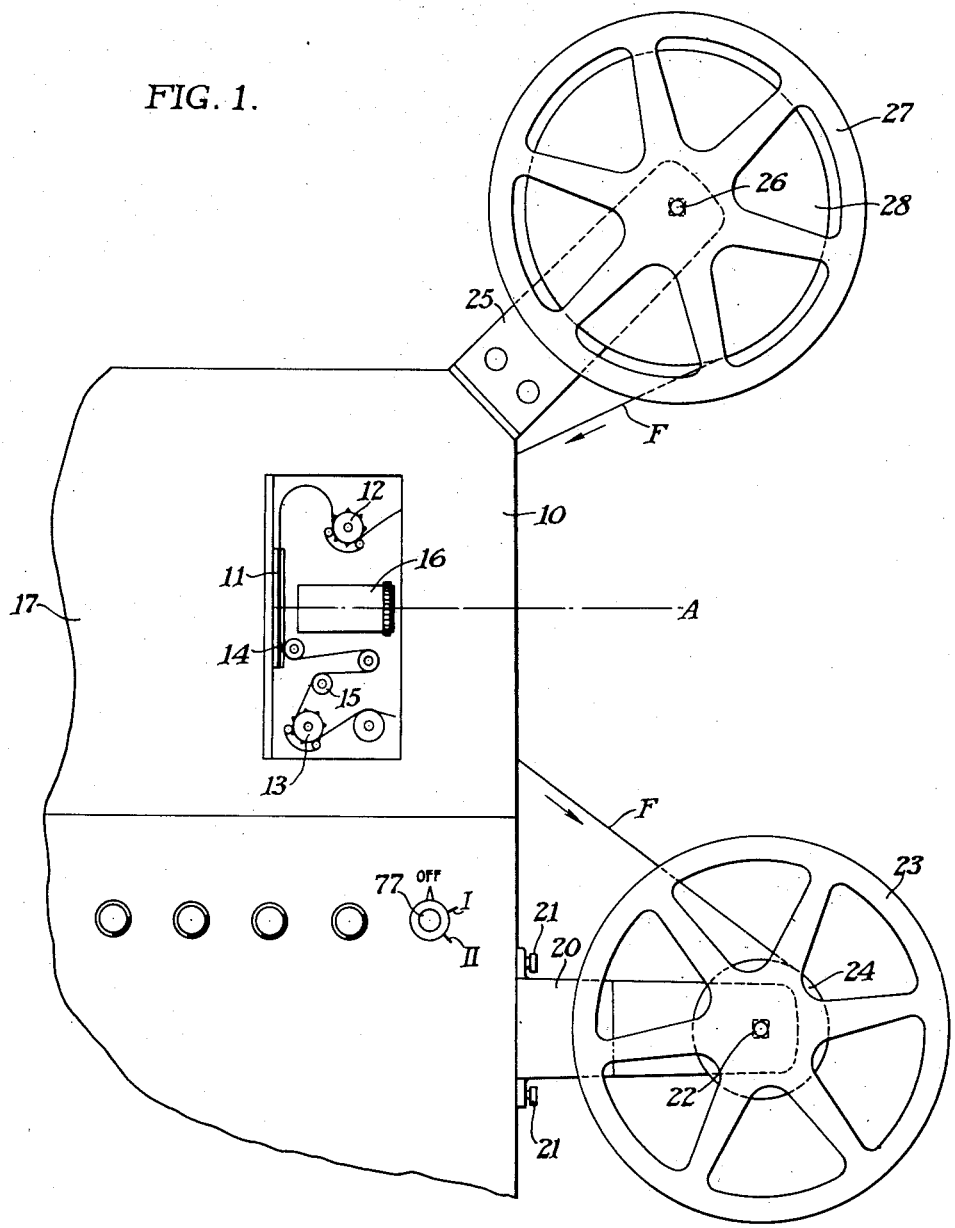
FRED N. WOODHOUSE
CHARLES E. SWING
INVENTORS

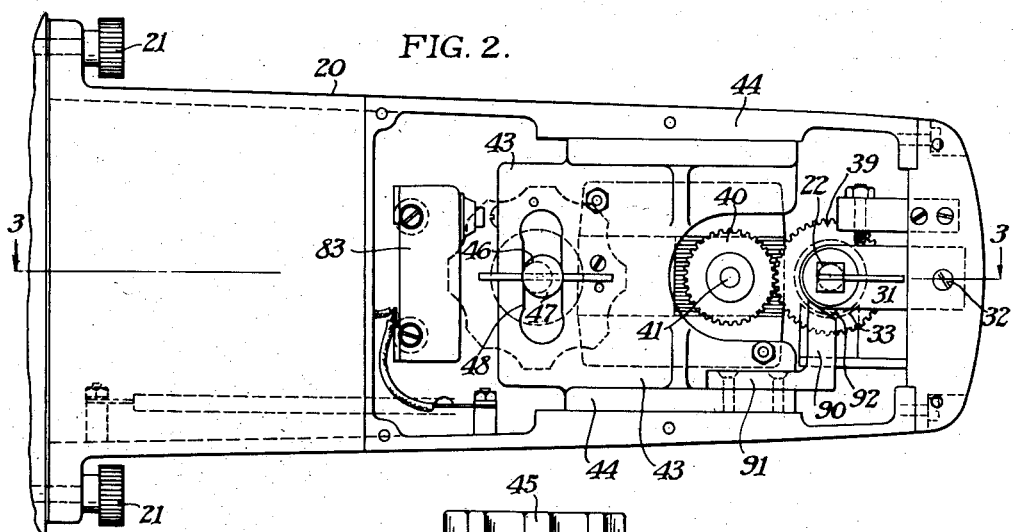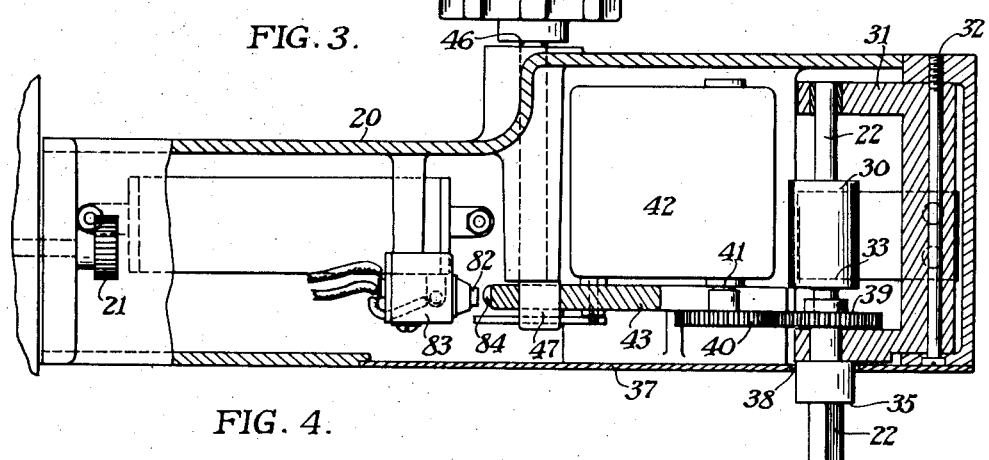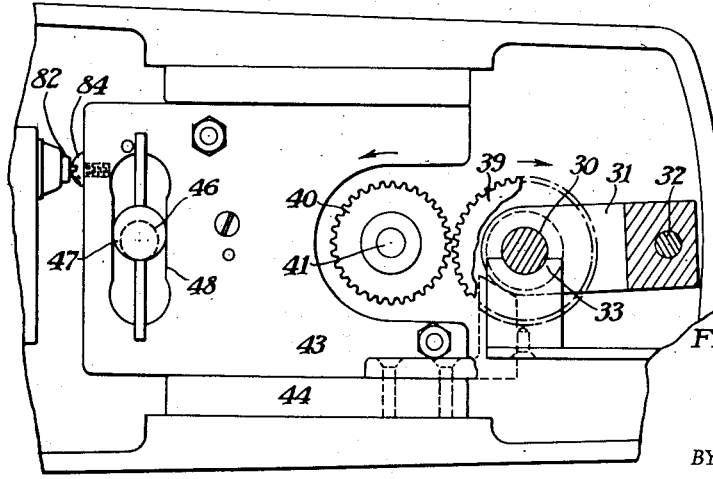

Oct. 16, 1951  F. N. WOODHOUSE ET AL  2,571,807
FILM WINDING AND REWINDING MECHANISM
Filed March 1, 1949  3 Sheets-Sheet 3
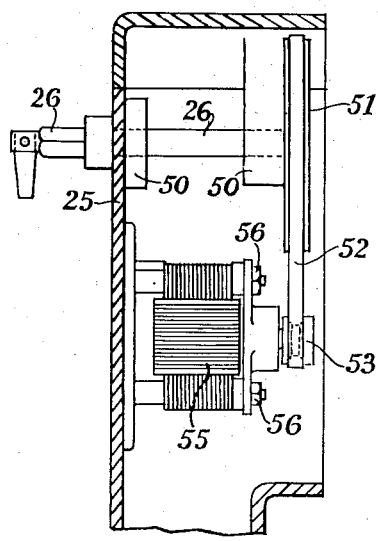
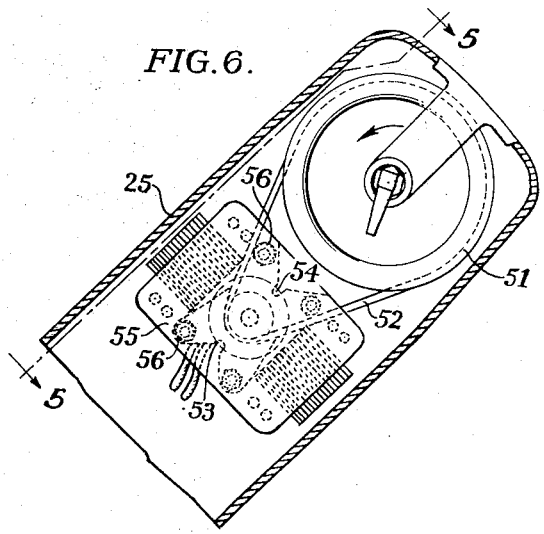
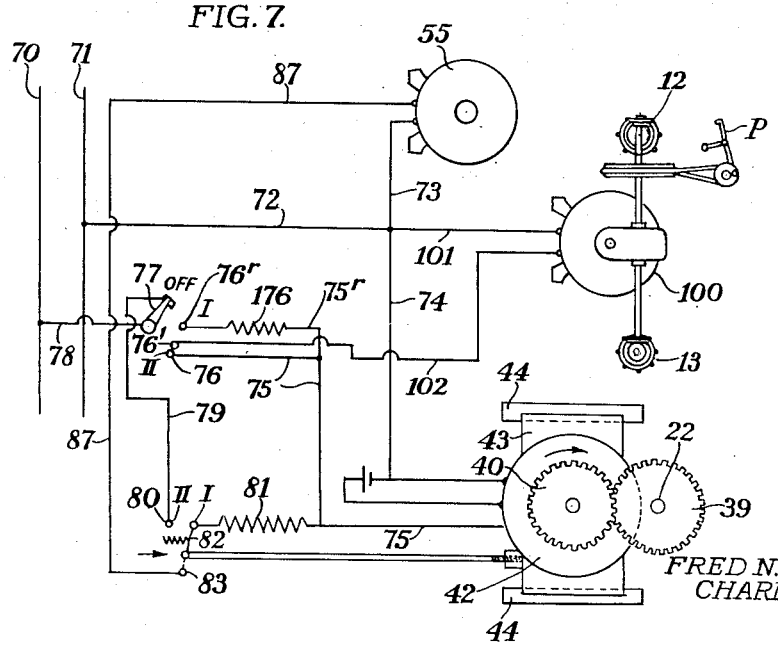
FRED N. WOODHOUSE
CHARLES E. SWING
INVENTORS
BY
ATTORNEYS Patented Oct. 16, 1951

2,571,807

UNITED STATES PATENT OFFICE 2,571,807

FILM WINDING AND REWINDING MECHANISM

Fred N. Woodhouse and Charles E. Swing, Rochester, N. Y., assignors to Eastman Kodak Company, Rochester, N. Y., a corporation of New Jersey Application March 1, 1949, Serial No. 78,985

13 Claims. (Cl. 242—55)

This invention relates to projectors, and particularly to film winding and rewind mechanism for motion picture projectors. One object of our invention is to provide a film-winding and rewinding mechanism in which the winding tension on the film will be substantially uniform. Another object of our invention is to provide a mechanism of the class described in which it is difficult to improperly operate the machine, particularly in starting; thereby reducing, if not eliminating, the possibility of breaking film as the machine starts. Another object of our invention is to provide a device of the class described which will insure even winding of the film and quick rewinding of the film. Still another object of our invention is to provide a differential braking mechanism which will insure an even tension on the film in rewinding. A still further object of our invention is to control the braking action on the rewinding film by means of the weight of the film. A further object of our invention is to provide a means for connecting and disconnecting a power drive for the take-up reel and to facilitate proper meshing of gears which are connected and disconnected through this operation. A still further object of our invention is to provide a simple mechanism for winding and rewinding film in which there is a definitely controlled back tension on the film during forward movement. Other objects will appear from the following specification, the novel features being particularly pointed out in the claims at the end thereof.

Coming now to the drawings wherein like reference characters denote like parts throughout:

Fig. 1 is a fragmentary side elevation showing a typical motion picture projector having film winding and rewinding mechanism constructed in accordance with and embodying a preferred form of our invention;

Fig. 2 is an enlarged side elevation of the take-up arm of the projector with a cover plate removed showing the film take-up mechanism;

Fig. 3 is a section taken on line 3—3 of Fig. 2;

Fig. 4 is an enlarged side elevation of the outer portion of the take-up arm shown in Figs. 1 and 2, showing the driving parts in a disconnected position;

Fig. 5 is a section taken on line 5—5 of Fig. 6 through the supply reel arm, parts being shown in elevation;

Fig. 6 is an elevational view of the supply reel arm with portions broken away to show the driving mechanism for the supply shaft; and Fig. 7 is a schematic electrical diagram showing in somewhat simplified form a circuit which may be used for the winding and rewinding mechanism.

Our invention consists broadly in providing a motion picture projector with a take-up shaft which may be driven through suitable gearing from a motor and which may be disconnected from the motor. The projector is also provided with a supply reel shaft which is connected to a suitable motor so that this motor, by having full voltage applied, may rewind film onto a spool carried by the supply shaft, or by supplying a reduced voltage to the motor may have a tendency to turn the film in a rewinding direction which tendency is overcome by a sprocket driven by a projector motor. Thus, at all times, an even back tension is provided on the film. In rewinding, the take-up motor is disconnected from the take-up shaft and a brake and brake drum are so arranged as to exert differential braking pressure upon the shaft, so that an even tension will be exerted on the film even when rewinding.

More specifically, and referring to the drawings, our invention may be applied to any standard type of motion picture projector which may include a housing 10, a film gate 11, film sprockets 12 and 13 above and below the gate, suitable guide rollers 14 and 15, and an objective carried by a lens mount 16 to project pictures along an axis A to a suitable screen. A lamp-house is of course included in the projector casing 17. As thus far described, this may be any suitable projector. A projector motor 100 drives sprockets 12 and 13 and pull-down P, Fig. 7.

The projector casing 10 may carry a lower or take-up arm 20 which may, if desired, be attached to the casing 10 by means of thumb-screws 21. This take-up arm includes a take-up shaft 22 on which any suitable film reel 23 may be placed to wind convolutions 24 of film F thereon when the projection operation is going forward. The casing 10 also supports an upper or supply arm 25 which may carry a supply shaft 26 which, in turn, may carry any suitable reel 27 on which convolutions 28 of film to be projected are wound. The film moves in the direction of the arrows shown in Fig. 1 during projection.

The lower or take-up arm 20, as indicated in Figs. 2, 3 and 4, is a box-like structure; this box-like structure enclosing the shaft 22 which carries a brake drum 30 shown in Fig. 3 by means of a yoke 31, this yoke being hinged at 32 to the arm 20. A brake shoe 33 lies beneath the brake drum 30 so that when the yoke 31 turns about the hinge 32, the brake and brake drum may contact. The end of the take-up shaft 22 may carry a latch element 34, as is well known, and there may be a shoulder 35 to limit the inward movement of a reel 23 on this shaft. A removable cover 37 for arm 20 has a slot 38 to permit the limited movement of the shaft 22 on the hinge carrier 31.

Shaft 22 carries a gear 39 and this gear is connectable and disconnectable to a second gear 40 carried by a shaft 41 of a motor 42. This motor is mounted on a plate 43 arranged to slide on tracks 44 carried by the arm 20. The sliding movement may take place when a rewind knob 45 turns a shaft 46 on which a cam 47 is mounted; this cam engaging a slot 48 in the slidable plate 43. Thus, by turning the knob, the motor 42 and its gear 40 may be moved from its operative driving position of Fig. 3 to its inoperative position of Fig. 4, and, when so moved, the hinged yoke 31 may turn about the pivot 32 so that the brake drum 30 may drop down on the brake shoe 33 to retard movement of the shaft 22. This retarding action is proportional to the weight of the convolutions 24 of film on the take-up reel 23.

The upper or supply reel arm 25 is also a hollow, box-like structure, and Fig. 6 illustrates the driving mechanism for the supply shaft 26. This supply shaft is carried by fixed bearings 50 in the arm 25, and shaft 26 carries a pulley 51. This pulley may be connected by a suitable belt 52 with a pulley 53 carried by a shaft 54 of a motor 55 which may be bolted as at 56 to the arm. This pulley and motor is connected at all times to the shaft 26 and always tends to turn this shaft in the direction of the arrow shown in Fig. 6.

When pictures are being projected and the film is moving from the supply to the take-up shaft, as indicated by the arrows in Fig. 1, a subnormal voltage is applied to motor 55 so that it merely tends to turn shaft 26 in the direction shown by the arrow in Fig. 6. This tendency is overcome, but it, nevertheless, produces a smooth and even back pressure on the film at all times. As the sprockets 12 and 13 are driven at a constant speed by the projector motor 100, which also drives a pull-down mechanism P, sprocket 12 overcomes the back tension on shaft 26 during projection. The back tension causes smooth film winding and prevents overrunning during operation of the machine. The back tension is preferably extremely light as, for instance, two ounces. It prevents an unbalanced supply reel from creating uneven feeding to sprocket 12.

While we prefer to include in the circuit the lamps for projection and sound, since this has no part in the present invention, the circuit shown in Fig. 7 has been limited to one which operates only the film winding and rewinding mechanism. As indicated in Fig. 7, the main line wires are 70 and 71. The circuit for the motors consists of a conductor 72 connected to line wire 71 and through the conductors 73 and 74 to the supply motor 55 and to the take-up motor 42. The take-up motor 42 is connected to a conductor 75 which leads to one terminal 76 of a three-position switch 77. A second conductor 75r leads from terminal 76r through resistance 176 to motor 42. Switch arm 77 has an "off" position, as indicated. It has an "on" position I in which it connects motor 42 through conductor 75r and resistance 176 to the line, and a position II in which it connects motor 42 through conductors 75 and 78 to the line wire 70. In the "off" position, the line wire 70 is connected through the conductor 79 to a switch terminal 80. Also connected to conductor 75 is a suitable resistance 81, this being connected to the terminal I of switch 80. A switch arm 82 which may, as indicated in Figs. 2 to 4 inclusive, be the switch arm of a microswitch 83, may be moved by the abutment 84 when the sliding plate 43, carrying the motor 42, is moved by the rewind knob 45. In the wiring diagram the abutment 84 is diagrammatically shown as a rod connected to the slide 43.

The switch arm 82 is connected by a conductor 87 to the supply motor 55. The operation of this circuit is as follows.

With the parts shown in the position of Fig. 1, the switch 77, which may be on the outer projector casing, as shown in Fig. 1, is turned from its "off" position to position I. This causes the conductors 75r, 75, 72, and 74 to energize the motor 42 at a reduced voltage, say 66% of normal line voltage. The motor 42 will turn the shaft 22 in a clockwise direction with respect to the drawings to wind film F upon a reel 23 and at a slow speed. This insures all slack being taken up between the sprocket 13 and reel 23 and the film, when drawn taut, will stop the reel from turning because motor 100 is not yet energized. At the same time microswitch 83 holds the contact arm 82 in the position I so that the conductor 75 passes current to the resistance 81 and it will then pass through switch arm 82 and conductor 87 to motor 55. This will cause the motor 85 to tend to turn in a counterclockwise direction, but with a very light torque merely drawing the film taut between sprocket 12, which is not yet turning, and reel 27.

The operator then moves switch arm 77 to II position. Terminals 76 and 76' are simultaneously engaged by switch arm 77 when moved to position II. Motor 100 is energized through conductors 72, 101, and 102 with full-line voltage. This operates sprockets 12 and 13 and pulldown P. In addition, full power is transmitted to the take-up motor 42 through conductors 75 and 78. Motor 42 tends to turn shaft 22 slightly faster than film is fed to it, and the already-taut film is thereby wound smoothly on reel 23. Since motor 55 is operating on much less current than is passed to motor 42, it tends to turn shaft 26 in a counterclockwise direction. Sprocket 12 overcomes this tendency and turns the supply shaft 26 in a clockwise direction so that the back tension holds the film taut with a light back pressure. It is usually necessary to adjust the resistance of resistance 81 until just the desired back tension is obtained, and we have found, in some instances, that sixty percent of the normal current may sometimes be sufficient to give the desired back tension. However, this percentage may be varied until the desired results are obtained.

The machine will continue to run until the film is wound off, or about to be wound off, of the supply reel 27, at which time the switch 77 may be turned to its "off" position. This will stop the winding or deenergize motor 42 and, at the same time, the circuit is broken to the motor 55. The operator now moves rewind knob 45, disconnecting gear 40 from gear 39. When this occurs, the yoke 31 drops a small fraction of an inch so that the brake drum 30 rests on the brake shoe 33. At the same time the slide 43 moves motor 42 to disengage the gears, as above described; it moves the abutment 84 into contact with the switch arm 82 of the microswitch 83, thus making a circuit through conductors 79, switch point 80, switch arm 82, and conductor 87 to the motor 55. Current will then flow through conductors 72 and 73 and motor 55 is energized under full current to turn the shaft 26 in a counterclockwise direction at a relatively high speed for rewinding the film.

During this movement there is no tendency for the film between the reels 23 and 27 to become slack because of the back pressure, due to the brake shoe 33 and the brake drum 30 on shaft 22. While the diameter of the convolutions 28 on the supply reel 27 remains small, and this reel rotates with a relatively high speed, the braking action of the shaft 22 through the brake drum 30 and brake shoe 33 is at its highest point because the greatest weight of convolutions 24 are then on the reel 23. However, as the diameter of the convolutions 28 on reel 27 enlarge, the convolutions on reel 23 materially decrease, the weight decreases and the varying diameters of the reels are compensated for, so that the motor 55 is able to continue winding film at a smooth, even rate due to the differential braking action.

Referring to Figs. 2 to 4 inclusive, the structure for intermeshing the gears 39 and 40 for the next projection run will now be described. The slide 43 carries a cam 90 on the end of an arm 91 attached to the slide so that as the knob 45 is turned to mesh the gears, this cam engages a curved surface 92 on the hinged yoke 31, gradually raising it the slight distance it is moved downwardly and assisting in meshing the teeth of the gears 39 and 40 and likewise raising the brake drum 30 from the brake shoe 33. This movement of course takes place automatically during the sliding of the motor and its gear 40. The teeth can readily be made to mesh for while they are shown in the drawing for convenience as being flat on the ends of the teeth, we prefer to have these teeth tapered to a sharp point as they will always mesh and so it will be impossible to cause one flat-toothed top to engage and lie on the other. This, of course, seldom occurs in any event, particularly where one gear is being moved during the time the meshing takes place.

With our above-described embodiment of our invention, it should be noted that improper threading and starting of the projector (which is one of the chief causes of film damage) is difficult, if not impossible. Since only a sub-normal voltage is applied to the take-up and supply motors, when the machine is started they only tend to turn, and this tendency is only sufficient to hold film taut between shaft 26 and sprocket 12 and sprocket 13 and shaft 22. If the film is taut, the end is properly engaged with reel 23 and will not pull away when switch 77 is operated to position II where full voltage is supplied to motors 42 and 100. There is and can be no sudden jerk or pull between either reel 27 and sprocket 12, or sprocket 13 and reel 23. The film just moves smoothly through the machine from reel-to-reel in winding, and, even in rewinding, slack in the film is prevented. This eliminates a large part of the winding and rewinding difficulties associated with projection, and particularly projection of narrow film, such as 16-mm.

While we have described a preferred embodiment of our invention, it is obvious that other embodiments will readily suggest themselves to those skilled in the art. We consider as within the scope of our invention all such embodiments as may come within the scope of the appended claims.

We claim:

1. In a film winding and rewinding mechanism for reducing strain on film passing through projectors, the combination with a support, of a supply and a take-up motor carried by the support, a supply shaft operably connected to the supply motor, a take-up shaft, operable connections between the take-up shaft and the take-up motor, a circuit including conductors leading to the supply motor for energizing the motor at full voltage, a first resistor in the circuit to the supply motor for energizing the supply motor at reduced voltage, the supply motor always tending to turn the supply shaft in a wind-up direction, the circuit including conductors leading to the take-up motor to energize said motor for turning the take-up shaft in a take-up direction at full voltage, a second resistor in the circuit to the take-up motor for energizing the take-up motor at reduced voltage to turn the take-up shaft in a take-up direction, and a manually operable switch in the circuit for selectively energizing both the supply and take-up motors through the circuit at reduced voltage to facilitate threading the projector.

2. A film winding and rewinding mechanism for reducing strain on film passing through projectors as defined in claim 1 characterized in that the circuit includes a second switch connecting the supply motor to full voltage of the circuit and disconnecting the supply motor from the reduced voltage of the circuit.

3. A film winding and rewinding mechanism for reducing strain on film passing through projectors as defined in claim 1 characterized in that the circuit includes a second switch for connecting the supply motor to full voltage of the circuit and disconnecting the supply motor from the reduced voltage of the circuit, said second switch including a manually operable handle for also disconnecting the take-up motor from the take-up shaft.

4. A film winding and rewinding mechanism for reducing strain on film passing through projectors as defined in claim 1 characterized in that the circuit includes a second switch for connecting the supply motor to full voltage of the circuit and disconnecting the supply motor from the reduced voltage of the circuit, said second switch including a manually operable handle, the operable connections between the take-up shaft and take-up handle including a gear carried by the take-up shaft and a gear driven by the take-up motor, said handle being connected to move one gear from the other gear when the full voltage of the circuit is connected to the supply motor.

5. A film winding and rewinding mechanism for reducing strain on film passing through projectors as defined in claim 1 characterized in that the circuit includes a second switch for connecting the supply motor to full voltage of the circuit and disconnecting the supply motor from the reduced voltage of the circuit, said second switch including a manually operable handle, a plate slidable on the support, means for moving the plate by the handle, and gears carried by the plate and take-up shaft movable into and out of engagement when said handle is moved.

6. A film winding and rewinding mechanism for reducing strain on film passing through projectors as defined in claim 1 characterized in that the circuit includes a second switch for connecting the supply motor to full voltage of the circuit and disconnecting the supply motor from the reduced voltage of the circuit, said second switch including a manually operable handle for also disconnecting the take-up motor from the take-up shaft, a brake drum on the take-up shaft, a pivotal support for the take-up shaft, a brake shoe against which the brake drum may rest when said take-up motor is disconnected from the take-up shaft.

7. A film winding and rewinding mechanism for reducing strain on film passing through projectors as defined in claim 1 characterized in that the circuit includes a second switch for connecting the supply motor to full voltage of the circuit and disconnecting the supply motor from the reduced voltage of the circuit, said second switch including a manually operable handle, a plate slidable on the support, means for moving the plate by the handle, and gears carried by the plate and take-up shaft movable into and out of engagement when said handle is moved, a cam carried by the slidable plate, a brake drum carried by the take-up shaft, a brake shoe carried by the support adjacent the brake drum, a hinged carrier supporting the take-up shaft and lying in the path of the cam carried by the slidable plate whereby said cam may hold the hinged carrier with the brake drum out of contact with the brake shoe when in one position.

8. A film winding and rewinding mechanism for reducing strain on film passing through projectors as defined in claim 1 characterized in that the circuit includes a second switch for connecting the supply motor to full voltage of the circuit and disconnecting the supply motor from the reduced voltage of the circuit, said second switch including a manually operable handle, a plate slidable on the support, means for moving the plate by the handle, and gears carried by the plate and take-up shaft movable into and out of engagement when said handle is moved, a cam carried by the slidable plate, a brake drum carried by the take-up shaft, a brake shoe carried by the support adjacent the brake drum, a hinged carrier supporting the take-up shaft and lying in the path of the cam carried by the slidable plate whereby said cam may hold the hinged carrier with the brake drum out of contact with the brake shoe when in one position, and, when the slidable plate is moved to disengage the gears, may move from the hinged carrier, which carrier may then drop, by gravity, to engage the brake drum and brake shoe.

9. In a film winding and rewinding mechanism for reducing strain on film passing through projectors, the combination with a support, of a supply and a take-up motor carried by the support, a supply shaft operably connected to the supply motor, a take-up shaft, operable connections between the take-up shaft and the take-up motor, film sprockets for moving a film between the film supply and the film take-up shafts, a film sprocket driving motor, a circuit including conductors leading to the supply motor for energizing the motor at full voltage, a first resistor in the circuit to the supply motor for energizing the supply motor at reduced voltage, the supply motor always tending to turn the supply shaft in a wind-up direction, the circuit including conductors leading to the take-up motor to energize said motor for turning the take-up shaft in a take-up direction at full voltage, a second resistor in the circuit to the take-up motor for energizing the take-up motor at reduced voltage to turn the take-up shaft in a take-up direction, conductors in the circuit for energizing the sprocket driving motor, and a manually operable switch in the circuit for selectively energizing both the supply and take-up motors through the circuit at reduced voltage to facilitate threading the projector, the manually operable switch holding the circuit through the conductors open to deenergize the sprocket driving motor when the supply and take-up motors are operated at reduced voltage.

10. In a film winding and rewinding mechanism for reducing strain on film passing through projectors, the combination with a support, of a supply and a take-up motor carried by the support, a supply shaft operably connected to the supply motor, a take-up shaft, operable connections between the take-up shaft and the take-up motor, film sprockets for moving a film between the film supply and the film take-up shafts, a film sprocket driving motor, a circuit including conductors leading to the supply motor for energizing the motor at full voltage, a first resistor in the circuit to the supply motor for energizing the supply motor at reduced voltage, the supply motor always tending to turn the supply shaft in a wind-up direction, the circuit including conductors leading to the take-up motor to energize said motor for turning the take-up shaft in a take-up direction at full voltage, a second resistor in the circuit to the take-up motor for energizing the take-up motor at reduced voltage to turn the take-up shaft in a take-up direction, conductors in the circuit for energizing the sprocket driving motor, and a manually operable switch in the circuit for selectively energizing both the supply and take-up motors through the circuit at reduced voltage to facilitate threading the projector, the manually operable switch holding the circuit through the conductors open to deenergize the sprocket driving motor when the supply and take-up motors are operated at reduced voltage, and closing the circuit to the sprocket driving motor when the switch is moved to a selected position to supply the take-up motor with full line voltage, and a second switch in the circuit for energizing the supply motor at full line voltage when the circuit is broken by the first-mentioned switch to deenergize the take-up motor and the sprocket driving motor.

11. In a film winding and rewinding mechanism for reducing strain on film passing through projectors, the combination with a support, of a supply and a take-up motor carried by the support, a supply shaft operably connected to the supply motor, a take-up shaft, operable connections between the take-up shaft and the take-up motor, a circuit including conductors leading to the supply motor for energizing the motor at full voltage, a first resistor in the circuit to the supply motor for energizing the supply motor at reduced voltage, the supply motor always tending to turn the supply shaft in a wind-up direction, the circuit including conductors leading to the take-up motor to energize said motor for turning the take-up shaft in a take-up direction at full voltage, a second resistor in the circuit to the take-up motor for energizing the take-up motor at reduced voltage to turn the take-up shaft in a take-up direction, and a manually operable switch in the circuit for selectively energizing both the supply and take-up motors through the circuit at reduced voltage, a pair of spaced film driving sprockets over which the film passes in moving between the supply and take-up shafts, a sprocket drive motor, conductors in the circuit for energizing said sprocket drive motor, said manually operable switch in the circuit energizing the sprocket drive motor only when the take-up motor is energized at full voltage.

12. In a film winding and rewinding mechanism for reducing strain on film passing through projectors, the combination with a support, of a supply and a take-up motor carried by the support, a supply shaft operably connected to the supply motor, a take-up shaft, operable connections between the take-up shaft and the take-up motor, a circuit including conductors leading to the supply motor for energizing the motor at full voltage, a first resistor in the circuit to the supply motor for energizing the supply motor at reduced voltage, the supply motor always tending to turn the supply shaft in a wind-up direction, the circuit including conductors leading to the take-up motor to energize said motor for turning the take-up shaft in a take-up direction at full voltage, a second resistor in the circuit to the take-up motor for energizing the take-up motor at reduced voltage to turn the take-up shaft in a take-up direction, and a manually operable switch in the circuit for selectively energizing both the supply and take-up motors through the circuit at reduced voltage, a pair of spaced film driving sprockets over which a film may pass from the supply reel shaft to the take-up reel shaft, a sprocket driving motor, conductors for energizing the sprocket driving motor, the said manually operable switch in the circuit having a plurality of positions in one of which the circuit is made to energize both the sprocket driving motor and the take-up motor at full line voltage.

13. In a film winding and rewinding mechanism for reducing strain on film passing through projectors, the combination with a support, of a supply and a take-up motor carried by the support, a supply shaft operably connected to the supply motor, a take-up shaft, operable connections between the take-up shaft and the take-up motor, a circuit including conductors leading to the supply motor for energizing the motor at full voltage, a first resistor in the circuit to the supply motor for energizing the supply motor at reduced voltage, the supply motor always tending to turn the supply shaft in a wind-up direction, the circuit including conductors leading to the take-up motor to energize said motor for turning the take-up shaft in a take-up direction at full voltage, a second resistor in the circuit to the take-up motor for energizing the take-up motor at reduced voltage to turn the take-up shaft in a take-up direction, and a manually operable switch in the circuit for selectively energizing both the supply and take-up motors through the circuit at reduced voltage and in another of which said circuit to the sprocket driving motor is broken when the circuit to energize the take-up motor under full voltage is broken, said manually operable switch having still another position in which the supply motor and take-up motor are energized under reduced voltage and in which the circuit to the sprocket driving motor is broken so that in threading there may be a light tension on the film as the film is threaded over the stationary sprockets.

FRED N. WOODHOUSE.
CHARLES E. SWING.

REFERENCES CITED

The following references are of record in the file of this patent:

UNITED STATES PATENTS

| Number | Name | Date |
|---|---|---|
| 2,365,691 | Fodor | Dec. 26, 1944 |
| 2,412,551 | Pratt et al. | Dec. 10, 1946 |
| 2,472,983 | Nemeth | June 14, 1949 |
| 2,487,476 | Pratt et al. | Nov. 8, 1949 |

FOREIGN PATENTS

| Number | Country | Date |
|---|---|---|
| 459,035 | Great Britain | Dec. 31, 1936 |